May 28, 1940.  W. H. D. BROUSE  2,202,136
SWITCH CONTROL DEVICE FOR FLUID PUMPS
Filed May 7, 1938  6 Sheets-Sheet 1

Inventor.
William H. D. Brouse
by
H. J. S. Dennison
atty.

Patented May 28, 1940

2,202,136

UNITED STATES PATENT OFFICE 2,202,136

SWITCH CONTROL DEVICE FOR FLUID PUMPS

William H. D. Brouse, Toronto, Ontario, Canada, assignor to International Metal Industries Limited, Toronto, Ontario, Canada Application May 7, 1938, Serial No. 206,627

4 Claims. (Cl. 221—95)

The present invention relates particularly to fluid dispensing devices such as are used in automotive service station equipment in the sale of gasoline and in which the fluid is elevated from a storage tank and forced through a suitable metering device to a delivery hose controlled by a suitably valved nozzle and a computing device for indicating the amount of liquid dispensed and the price thereof, is operated from the meter device.

The principal objects of this invention are to provide a device for controlling the operation of the pump motor which will ensure the resetting of the price and quantity-computing device to the zero position in order that the operation of the dispensing pump motor may be started and maintained throughout a normal dispensing operation, unless the starting device is manually held in the operating position which is of course readily observable by the customer, thereby protecting both the customer and the owner against loss through carelessness or intent on the part of the operator.

A further and important object is to provide a control mechanism of a simple and durable construction which will effectively withstand the rigours of the operating conditions to which such mechanisms are subject and which may be manufactured at comparatively low cost.

The principal features of the invention consist in the novel construction and arrangement of a toggle latch mechanism operatively connected with the computing mechanism and co-operating with a pair of plungers and a member operated thereby to operate the pump switch, whereby said pump switch will not remain closed to operate the pump if the computing mechanism is not returned to the zero position.

In the accompanying drawings,

Figure 2 is an elevational view of the motor control mechanism looking toward the inward ends of the operating plungers.

Figure 4:
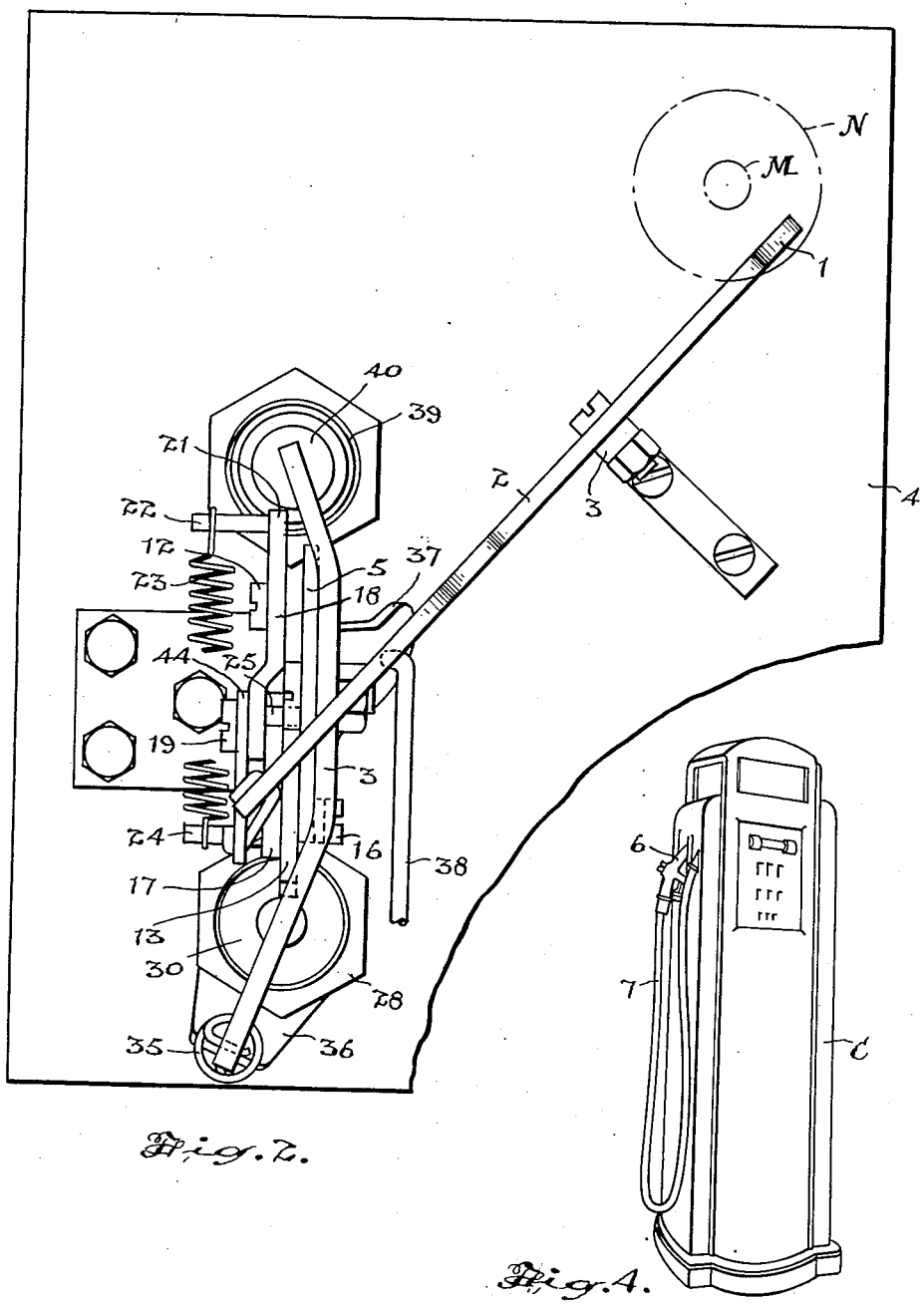
Figure 4 is a small perspective view of a fluid pump of the type to which the present invention is applied.
Figure 8:
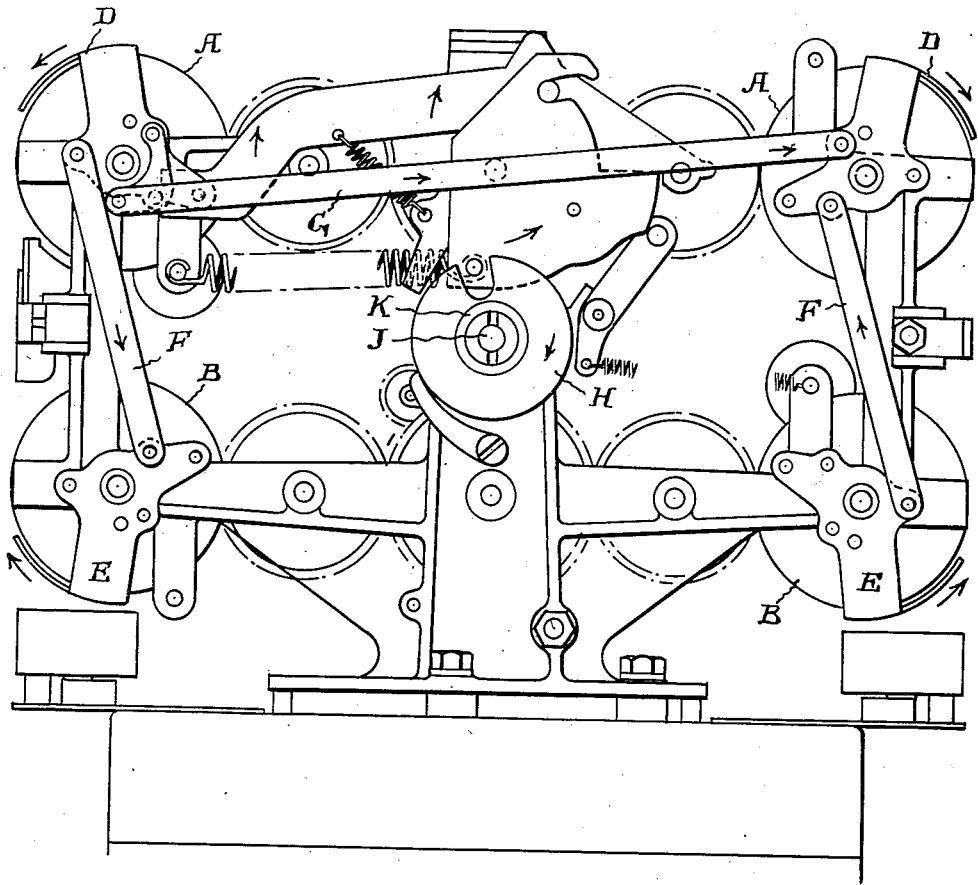
Figure 8 is a diagrammatic elevational view of the computing mechanism illustrating the arrangement of the shutter mechanism which is operatively associated with the motor-starting mechanism.

Fluid dispensing pumps provided with computing devices which indicate the quantity of fluid dispensed and the price by means of numbered discs are commonly in use and the structure illustrated in Figure 8 shows cylinders A and B supported on opposite sides of a framework which is mounted within the casing or standard C (Figure 4) so that the numerals on the cylinders show through suitable openings on opposite sides of the standard.

Pivotal shutters D and E are mounted to swing on the axes of these cylinders and they are interconnected by links F and G so that they all operate simultaneously. These shutters and their operating connections do not form part of the present invention and are merely shown to illustrate how they are operatively connected with the control switch mechanism of the dispensing pump.

The shutter mechanism is operated by a disc H mounted on a shaft J which has a slotted hub K which projects through the casing L which surrounds the computing device.

An extension shaft M having a tapered end $m$, centered in the slotted end of the shaft K, is driven by a pin $m'$ extending into the slot. The shaft M carries a cam N, the cam face of which engages the lug end 1 of a lever 2 which is pivotally mounted on a rigid arm 3 mounted on the inner side of the pump casing or frame here shown in the form of a rigid plate 4.

The hose hook 5 upon which the dispensing nozzle 6 of the hose 7 is supported when the pump is not operating, is here shown formed of a flat piece of steel plate extending through a slot 8 in the plate 4 and rigidly secured by means of an angle bracket 9 arranged on the inner side of the plate, the hook having an upturned outer end 10.

The inward end of the hose hook is widened intermediate of its length and has a vertical slot 11 extending upwardly from the bottom thereof, and arranged in vertical alignment with the slot and spaced thereabove, is a bolt 12. A sliding latch member 13 is arranged in a vertical position to slide on one face of the enlarged portion of the hose hook and has a longitudinal slot 14 at its upper end through which the shank of the bolt 12 extends.

A bolt 15 extends through the vertical slot 11 having its head 16 arranged on the side of the hose hook extension opposite to the latch member 13 and said bolt extends through a hole in the latch member and has pivotally mounted on its inner end a link 17. A link 18 having an offset end is pivotally connected to the free end of the link 17 by a bolt 19 and it is provided with a longitudinal slot 20 through which the shank of the bolt 12 extends. The upper end of the link 18 is formed with an extension lug 21 which is offset at one side thereof and has a pin 22 mounted therein. A coil tension spring 23 has one end thereof looped around the pin 22 and said spring extends angularly across the links and latch and the lower end is looped around a pin 24 secured in the hose hook plate.

A stop pin 25, secured in the hose hook plate at the inward side of the latch 13, engages the connected links 17 and 18 when they are in substantial alignment lying directly over the latch 13, the diagonal pull of the spring 23 holding the toggle links in contact with the pin 25, and as the links are pivotally connected to the latch by the bolt 15, the spring urges the latch member downwardly. The bottom end of the latch member is provided with a long sloping edge 26 and a short bevelled surface 27.

A bushing 28 is mounted on and extends through the plate 4 immediately below the hose hook 5 and a plunger 29 is slidably mounted in this bushing and extends outside of the pump casing so as to be readily available to the operator.

The inner end of the plunger 29 is provided with a frustro-conical head 30, the angle of which is a long taper of substantially the same angle as the long slope 26 of the latch member. This head is provided with a short bevelled surface 31 at its larger end which is of substantially the same bevel as the short bevelled edge 27 of the latch member.

Figure 5:
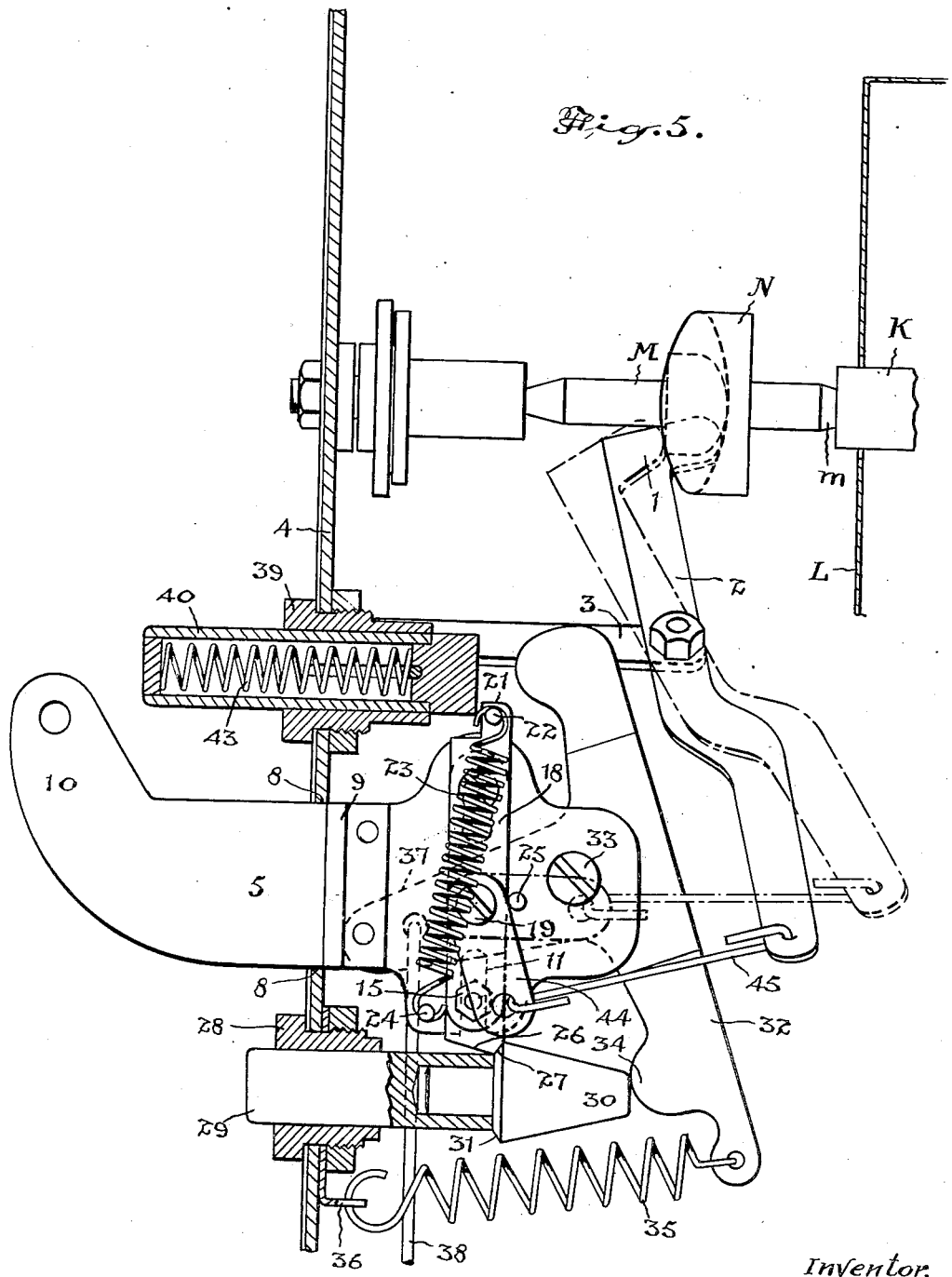
Figure 5 is an elevational part sectional view of the motor-operating plunger mechanism showing the starting plunger pushed in and held in the position to maintain the operation of the fluid pump.
Figure 6:
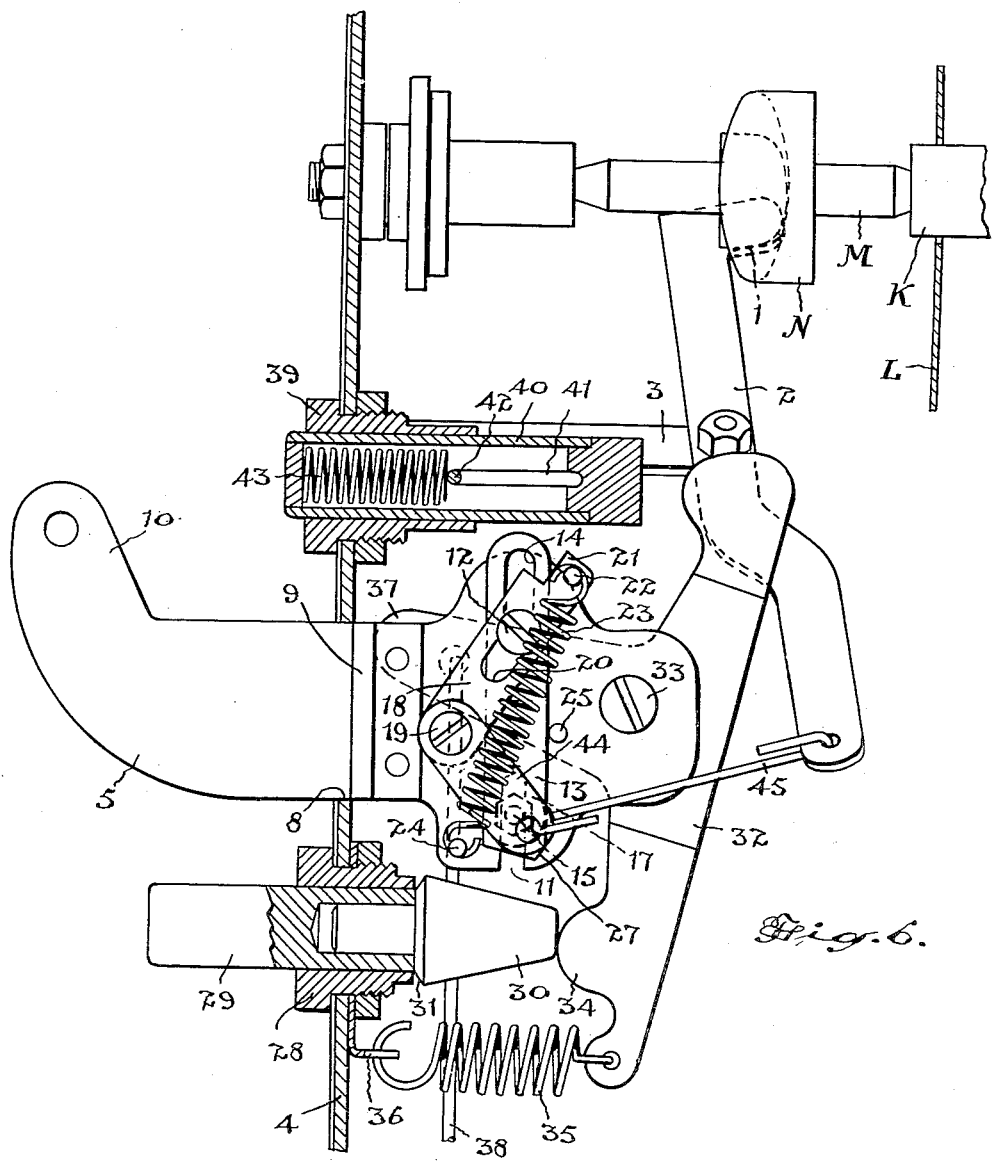
Figure 6 is an elevational part sectional view of the motor-operating plunger mechanism showing the stopping plunger in the pushed-in position and the toggle latch mechanism for holding the starting plunger disengaged therefrom.

When the toggle links are in the straight line position the pull of the spring 23 holds the long bevel surface of the latch in contact with the long bevel surface of the plunger head and when the plunger is pushed inwardly the latch rides up on the conical portion and ultimately slips in behind the short bevel surface 31 of the base of the frustro-conical head and the spring holds the latch in this position and locks the plunger in its inward position as shown in Figure 5.

A rocker arm 32 is pivotally mounted on a bolt 33 secured in the inward end of the hose hook member and it is provided with a rounded lug 34 which engages the inner end of the plunger head 30. A coil tension spring 35 is connected at one end to the lower extremity of the rocker arm 32 and at the other end to a lug 36 extending downwardly below the bushing 28. This spring holds the rocker arm lug in close engaging contact with the plunger head 30.

The rocker arm is provided with a centrally arranged arm 37 extending at substantially right angles from the main portion and a rod 38 is pivotally mounted adjacent to the free end of this arm extension of the rocker member and is connected with the motor switch (not shown) which may be of any suitable type, so that upon pressing in the plunger 29 the rocker arm is swung on its pivot to swing its angularly-disposed arm 37 downwardly and through the rod 38 to close the motor switch and start the pump motor into operation.

Figures 1, 3:
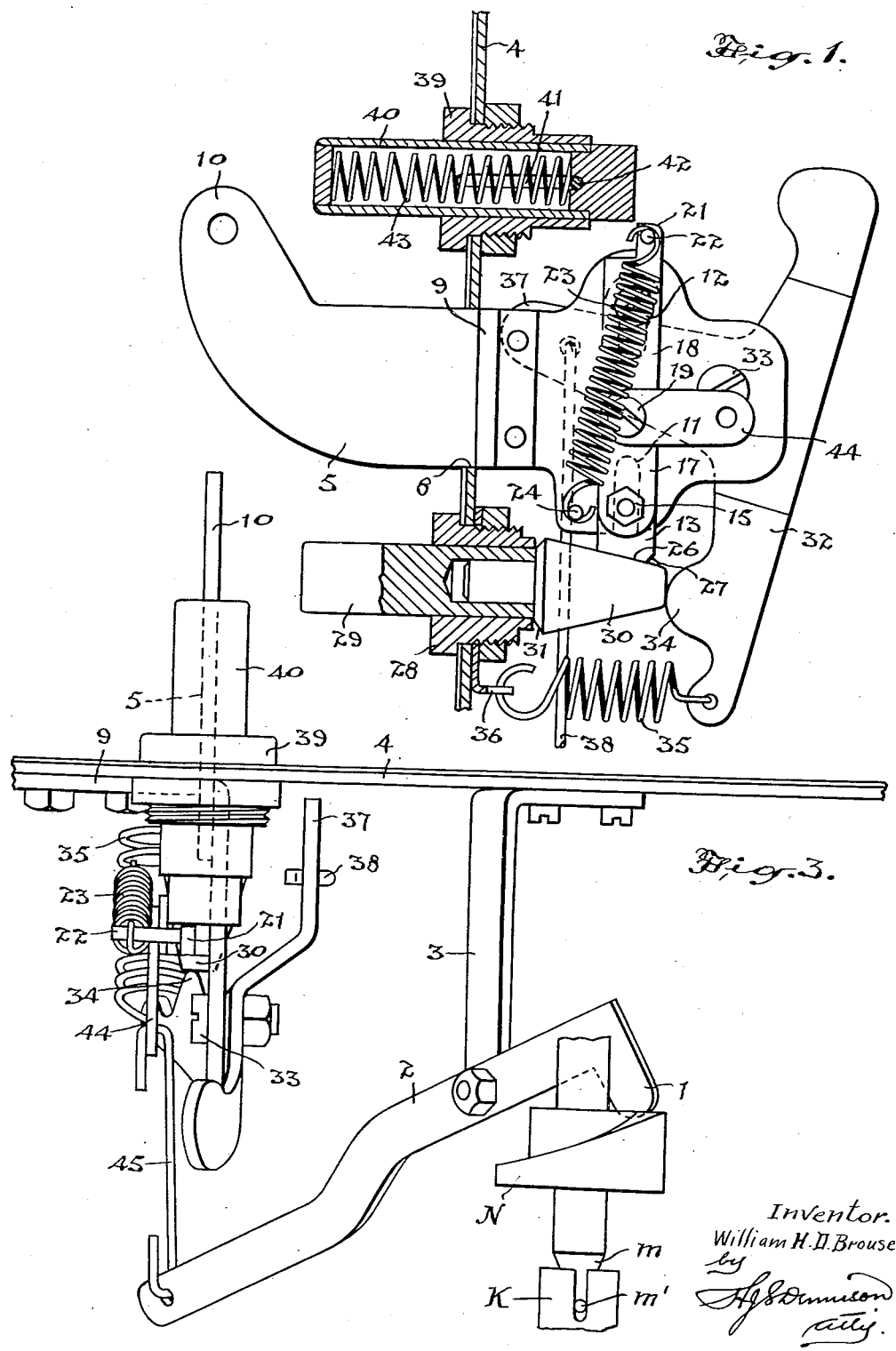
Figure 1 is an elevational part sectional view of the motor-operating plunger mechanism in position for starting the motor for operating the pump.
Figure 3 is a plan view in part section looking down on the structure illustrated in Figures 1 and 2.

A bushing 39, similar to the bushing 28, is secured in the plate 4 immediately above the hose hook 5, and a plunger 40 is slidably mounted in said bushing. This plunger is provided with diametrically opposed longitudinal slots 41 and a pin 42, secured in the inner end of the bushing, extends through the slots in the plunger. A coil compression spring 43 is arranged between the pin and the outward end of the plunger and normally holds the plunger to its extreme outward position as illustrated in Figures 1 and 5. When the plunger is in the outward position the inward end is, as illustrated in Figure 1, clear of the lug end 21 of the link 18, but when the motor-starting plunger 29 is pushed inwardly, the conical head of the plunger engages the latch 13, sliding it upwardly, thereby moving the lug 21 to a position above the lower edge of the plunger 40, as clearly illustrated in Figure 5.

When the latch is in this position, holding the starting plunger inwardly and the rocker arm 32 tilted so that the motor switch is closed, the motor will continue to operate and when it is desired to stop the motor it is merely necessary to push in the plunger 40 so that it engages the lug 21 of the link 18, causing the link to tilt or swivel upon the bolt 12 until the centre joint of the toggle formed by the links 17 and 18 passes the longitudinal axis of the spring 23, whereupon the pull of the spring breaks the toggle and the lower link pulls upwardly on the latch 13, drawing it entirely out of contact with the head of the starting plunger 29.

Immediately the latch is withdrawn from engagement with the head of the starting plunger, the tension of the spring 35 swings the rocker arm on its pivot, pushing the plunger outwardly and simultaneously swinging its arm 37 upwardly, pulling upward on the rod 38 and opening the motor switch, thereby stopping the pump motor.

Figure 7:
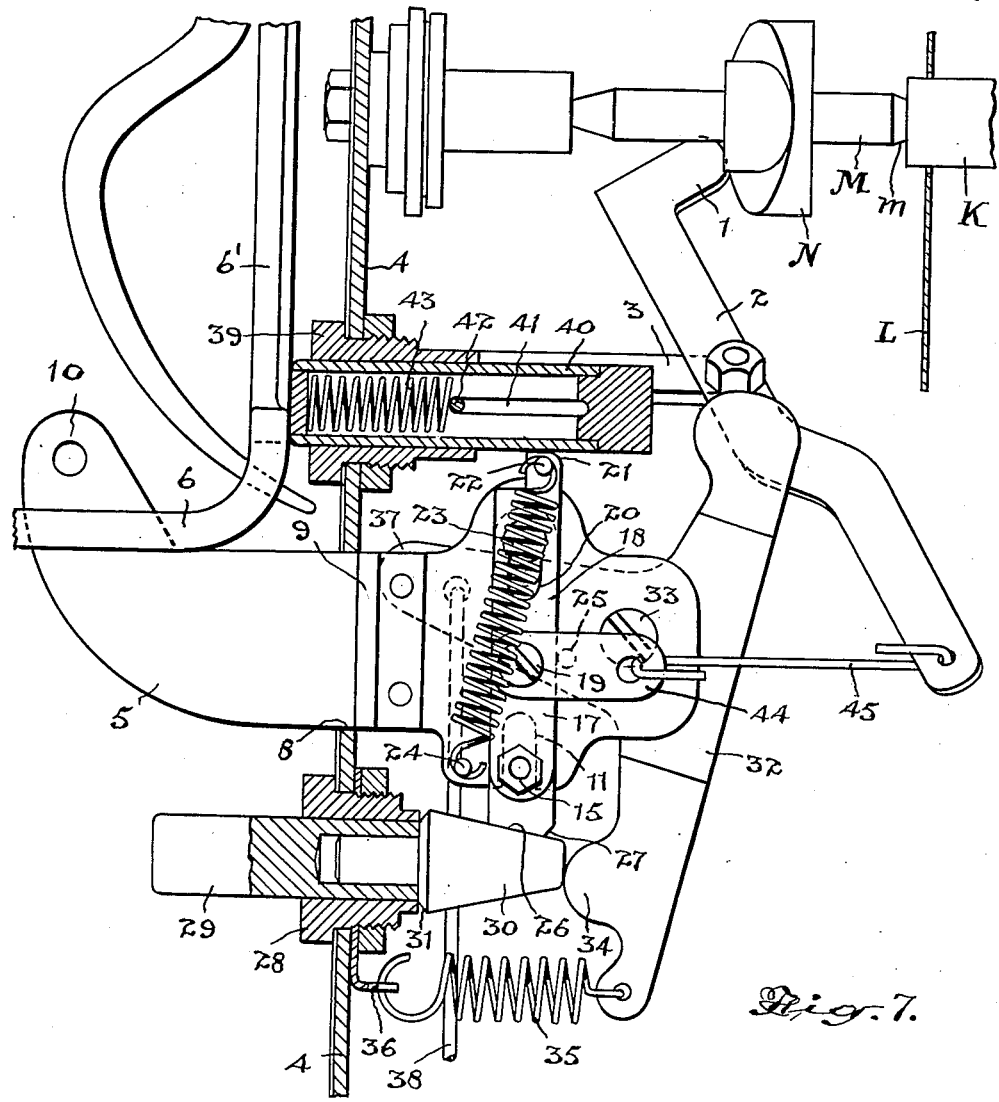
Figure 7 is an elevational part sectional view of the motor-operating plunger mechanism with the toggle mechanism reset and the stopping plunger pressed in as when the dispensing nozzle is mounted on the hook, thereby preventing the starting plunger from being operated.

When the guard 6' of the dispensing nozzle 6 is placed on the hose hook, it engages the plunger 40 pressing it inwardly to the position shown in Figure 7, and when the plunger is held in this position, any attempt to operate the starting plunger 29 will swing the member 32 to move its upper end 32' into contact with the inner end of the plunger 40 which prevents the operation of the rocker arm a distance sufficient to operate and close the motor switch, thus securely locking the switch-operating mechanism without removing the dispensing nozzle from the hook.

A link 44 pivotally mounted on the bolt 19, forming the toggle joint of the links 17 and 18, is connected by a loose rod connection 45 with the free end of the lever 2, which is pivoted intermediate of its length. When the latch is in position in locking engagement with the head of the starter plunger 29 with the pump motor operating, the link 44 and its connecting rod 45 with the lever 2, hangs loosely as shown in Figure 5, but when the toggle is broken in the manner described by pushing in the stopping plunger 40, the link 44 swings to a substantially horizontal position by the lug end 1 of the lever 2 being engaged by the operating surface of the cam N mounted on a shaft M operatively connected with the shaft K of the computing device. When the computing device is operated to reset the indicating cylinders thereof, the shaft K is rotated a complete revolution, thereby rotating the shaft M so that the cam N first swings the lever 2 on its pivot and through the rod 45 and link 44 returns the toggle, formed by the links 17 and 18, to its straight line position and then releases the link connection allowing the said rod 45 and link 44 to return to the position illustrated in Figure 5, so that the latch is free to operate and the toggle is free to break without any hindrance from the lever 2.

It will be understood that when the toggle is broken and the latch is raised entirely clear from engagement with the starting plunger by the action of the spring 23, the starting plunger may be pushed inwardly and the motor started if the stopping plunger is released, but the starting plunger will have to be held in by the operator in order to continue the operation of the motor. Such an action is of course immediately obvious to the customer and the operator cannot hold in the starting plunger and manipulate the dispensing nozzle simultaneously.

It will also be noted that when the dispensing nozzle is in position on the hose hook the stopping plunger is pressed inwardly and any attempt to operate the pump with the nozzle in position on the hook, will be frustrated as the latch member will, upon being lifted by the starting plunger, engage the underside of the stopping plunger and the latch member will thus lock the starting plunger from further inward movement as is illustrated clearly in Figure 7.

It will be readily appreciated that a device constructed as herein described is extremely rugged and will effectively resist abusive attempts to operate same in an unauthorized or improper manner and further that the parts are of simple and inexpensive construction. Further it will be understood that this device may be applied to many different constructions of dispensing pumps without necessitating any material change in the construction of their operating mechanism.

What I claim as my invention is:

1. A switch control device for fluid pumps comprising the combination with a motor starting switch and a computing mechanism, of a rocker member operatively connected with the motor switch and spring held to hold the motor switch open, a "starting" plunger adapted to engage and operate said rocker member to close the switch, said plunger having a bevelled surface leading to a shoulder, a latch member slidably mounted and having a bevelled end to engage the bevelled surface of said plunger and adapted to engage and lock behind said shoulder, a toggle having one link thereof pivotally connected to said latch member and the other link pivotally and slidably supported, a tension spring fixed at one end and having its other end connected to the sliding toggle link and springholding the toggle links in alignment with and spring operating said latch member, a link pivotally connected to the joint connection of said toggle links, means connected with the latter link operated by the resetting of the computing mechanism for resetting the toggle and latch members, and means adapted to engage the free end of the slidable toggle link to swing same on its sliding pivot to break the toggle.

2. A switch control device for fluid pumps comprising the combination with a motor starting switch and a computing mechanism, of a rocker member operatively connected with the motor switch and spring held to hold the motor switch open, a "starting" plunger adapted to engage and operate said rocker member to close the switch, a toggle latch mechanism spring-operated to engage and hold said plunger in the switch-operating position, a "stopping" plunger adapted to be operated to engage and break said spring held toggle spring held clear of said toggle, and means operated by the resetting of the computing mechanism for resetting said toggle and latch mechanism.

3. A switch control device for fluid pumps comprising the combination with a motor starting switch and a computing mechanism, of a pair of plungers parallelly arranged and spaced apart, a rigid support arranged between said plungers, a rocker member pivotally mounted on said rigid support and having its ends extending into alignment with and to be engaged by said plungers, an arm extending from said rocker member, means connecting said arm with the motor switch, a tension spring holding said rocker member in operative engagement with one of said plungers, a latch slidably mounted on said fixed support and having one end lockingly engageable with the latter of said plungers, a toggle mechanism mounted on said latch and resiliently holding said latch in engagement with the latter plunger, said toggle mechanism having one end thereof movable into operative alignment with the other plunger when the latch is in locking relation to the other plunger and the rocker member and adapted to be operated by displacement of the second-mentioned plunger to break the toggle and free the first-mentioned locked plunger, and means for resetting the toggle.

4. A switch control device for fluid pumps comprising the combination with a motor starting switch and a dispensing nozzle, of a rigid hook for supporting said nozzle, a "stopping" plunger spring held outwardly above said hook, a "starting" plunger slidably mounted below said hook, a rigid support extending inwardly from said hook between said plungers, a rocker member mounted on said rigid support and having its opposite ends extending into alignment with said plungers, a toggle latch mechanism mounted on said rigid support adapted to engage in locking contact with the "starting" plunger and extending into alignment with the end of the "stopping" plunger to be broken to release the latch by the operation of said "stopping" plunger, said "stopping" plunger when engaged by said dispensing nozzle mounted on the hook extending inwardly and locking said rocker member and "starting" plunger, and means for resetting the toggle latch mechanism.

WILLIAM H. D. BROUSE.